United States Patent [19]

Nishimura et al.

[11] Patent Number: 4,785,682
[45] Date of Patent: Nov. 22, 1988

[54] POWER TRANSMISSION DEVICE

[75] Inventors: Sadanori Nishimura; Yuji Kishizawa, both of Saitama; Yukio Kato, Tokyo, all of Japan

[73] Assignee: Honda Giken Kogyo Kabushiki Kaisha, Tokyo, Japan

[21] Appl. No.: 52,312

[22] Filed: May 20, 1987

[51] Int. Cl.⁴ .................... F16H 3/08; F16H 37/00
[52] U.S. Cl. ........................................ 74/359; 74/333; 74/15.66
[58] Field of Search ............... 74/359, 357, 360, 333, 74/335, 15.88, 15.82, 15.66

[56] References Cited

U.S. PATENT DOCUMENTS

| | | |
|---|---|---|
| 2,269,215 | 1/1942 | Mair ...................................... 74/359 |
| 2,991,661 | 7/1961 | Rambansek ........................ 74/359 X |
| 4,252,031 | 2/1981 | Nishimura et al. .................... 74/360 |
| 4,294,130 | 10/1981 | Kisaka et al. ......................... 74/15.4 |
| 4,318,305 | 3/1982 | Wetrich et al. .................... 74/357 X |
| 4,549,443 | 10/1985 | White .............................. 74/333 X |
| 4,697,471 | 10/1987 | Hiketa .................................. 74/359 |

FOREIGN PATENT DOCUMENTS

| | | |
|---|---|---|
| 46-21138 | 6/1971 | Japan . |
| 47-27295 | 8/1972 | Japan . |
| 53-50984 | 12/1978 | Japan . |
| 54-42561 | 4/1979 | Japan . |
| 57-109022 | 7/1982 | Japan . |
| 59-160623 | 9/1984 | Japan . |
| 61-81819 | 4/1986 | Japan . |
| 2053405 | 2/1981 | United Kingdom ............... 74/15.66 |
| 2110324 | 6/1983 | United Kingdom .................. 74/357 |

Primary Examiner—Dirk Wright
Attorney, Agent, or Firm—Lyon & Lyon

[57] ABSTRACT

A power transmission device for use in a motor vehicle in which an engine is mounted on the front part and a transmission case is mounted on the rear part of the vehicle. A plurality of shifting shafts are axially supported within the transmission case in parallel with one another. Between these shift shafts, a plurality of shifting gear trains, which are engaged and disengaged by a hydraulic clutch, are provided. One of the shifting shafts is connected to the output side of a wet multi-disc main clutch which is disposed in a separate chamber within the transmission case. The input side of the clutch is connected to the engine. An oil pump is disposed within the transmission case. Oil discharged from the pump is controlled by a control valve and is then supplied to the respective oil clutches and bearings through an oil passage disposed along the wall of the transmission case and an oil passage disposed in the axial direction within the shifing shaft. The engine power, which is changed in speed, is transmitted to the front wheels through a front wheel drive shaft and also transmitted to an agricultural machinery through a PTO shaft.

10 Claims, 15 Drawing Sheets

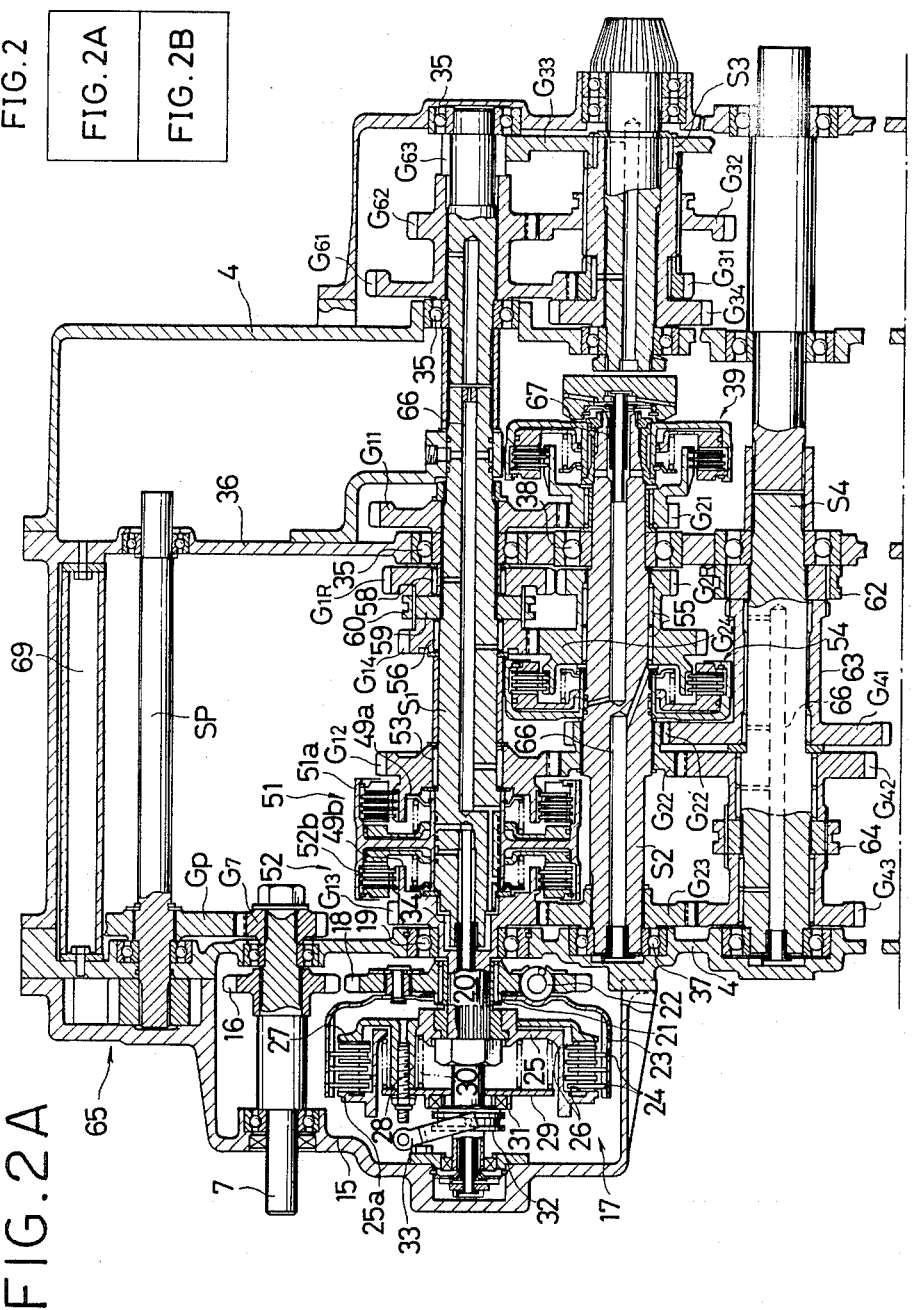

POWER TRANSMISSION DEVICE

BACKGROUND OF THE INVENTION

This invention relates to a power transmission device for use in a motor vehicle, the device being particularly suitable for tractors.

In an agricultural tractor, an engine is usually mounted on a front part of the tractor body and a transmission case is usually mounted on a rear part thereof. The main shaft of the engine is connected to a propeller shaft by a main clutch. The propeller shaft extends backwards along the tractor body and is connected to an input shaft axially supported on the transmission case. The transmission case contains a shift mechanism. The power of the engine which is input to the input shaft is transmitted to the main shaft through the shift mechanism. The rear wheels are driven by the main shaft. In the case of a four-wheel drive, the main shaft is further connected to a front-wheel drive propeller shaft and the propeller shaft extends forwards from the transmission case to drive the front wheels. The transmission case is further provided with aPTO shaft. The power of the engine is also transmitted to this PTO shaft and is then transmitted to a machine connected to the tractor through the PTO shaft.

SUMMARY OF THE INVENTION

The object of the present invention is to improve the above-mentioned conventional power transmission device and to obtain a power transmission device for use in a motor vehicle which is compact, easy to operate and maintain, and smooth and quiet during speed changing operations.

A power transmission device for use in a motor vehicle according to the present invention comprises a wet multi-disc main clutch provided in a separate chamber within a transmission case and connected at its input side to an engine, a plurality of shifting shafts axially supported within the transmission case, a hydraulic shifting clutch comprising a first gear disposed among the plurality of shifting shafts and engaged with and disengaged from one shifting shaft by a hydraulic clutch and a second gear connected to the other shifting shaft and meshed with the first gear, and means for connecting a main shaft of the wet multi-disc main clutch to at least one of the shifting shafts.

According to the present invention, since a hydraulic pump for generating oil pressure for lubricating various parts of the power transmission device and for engaging or disengaging the clutch adjoins the transmission case in a position closer to the engine than the main clutch so that it can be driven by the engine whether the clutch is engaged or not, the hydraulic system becomes simple and the hydraulic fluid piping can be shortened. Furthermore, since the main clutch housing of a conventional tractor becomes unnecessary and the wet multi-disc clutch is situated within the transmission case, the engine and transmission case can be easily mounted on or removed from the tractor body. Furthermore, since the main clutch is of a wet multi-disc type, the size thereof is small. Thus, the power transmission device can be made compact. According to one aspect of the present invention, there is provided a multistage gear shifting device for use in a motor vehicle in which first speed to fourth speed gear trains and reverse gear trains are arranged between two shafts in an order such that a low speed gear train comes first, gears of each gear train being able to engage with and disengage from one of the two shafts through a hydraulic clutch. The gear shifting device includes a manual valve having operating positions corresponding to first speed to fourth speed and reverse and adapted to selectively operate hydraulic clutches for the respective gear trains.

In this multistage gear shifting device, one gear of the afore-mentioned fourth speed gear train and one gear of the afore-mentioned reverse gear train are integrally formed with each other, loosely fitting on the afore-mentioned one of the two shafts and detachably engaged with the afore-mentioned one of the two shafts through a common hydraulic clutch, whereas the other gears of the afore-mentioned fourth speed and reverse gear trains are loosely fit on the other shaft. In addition, the multistage gear shifting device includes a selector for selectively engaging the other gears of the afore-mentioned fourth speed and reverse gear trains, an actuator for actuating the selector in response to the action of the manual valve, and a switching valve annexed to the actuator, the switching valve guiding hydraulic oil from the manual valve to the common hydraulic clutch when the manual valve is brought to an operating position corresponding to fourth speed or reverse and discharging the hydraulic oil in the common hydraulic clutch through the manual valve when the manual valve is brought to another operating position. The selector engages the other gears of the reverse gear train to the other shaft when the manual valve is in an operating position corresponding to first speed, second speed, or reverse and engages the other gears of the fourth speed gear train to the other shaft when the manual valve is in an operating position corresponding to third speed or fourth speed.

According to the present invention, the fourth speed and reverse gear trains are detachably engaged with one of the two shafts by a single hydraulic clutch. Accordingly, the required number of hydraulic clutches can be reduced. Thus, the gear shifting device can be made small, light, and inexpensive. Moreover, when the gear is shifted into fourth speed or reverse, no noises are generated and the service life is prolonged since the other gears are already engaged with the other shaft in the preceding stage through the selector.

According to another aspect of the present invention, there is provided a hydraulic shifting device in which a clutch oil passage and a lubricating oil passage are formed in the axial direction along the axis of a shifting shaft.

According to a further aspect of the present invention, there is provided a four-wheel drive motor vehicle including a hydraulic pump situated on a wall portion of a transmission case, and a front-wheel drive clutch comprising a wet multi-disc hydraulic clutch provided in a power transmission passage for transmitting power from a prime mover to the front wheels within the transmission case for closing the passage, the front-wheel drive clutch being located in the vicinity of the wall portion where the hydraulic pump is situated.

The above and other objects, features, and advantages of the present invention will become apparent to those skilled in the art from the following description by referring to the drawings, in which preferred embodiments of the present invention are illustrated.

DETAILED DESCRIPTION OF THE PREFERRED EMBODIMENTS

The present invention will be described hereunder with reference to the illustrated embodiments.

(Overall Structure)

Figure 1:
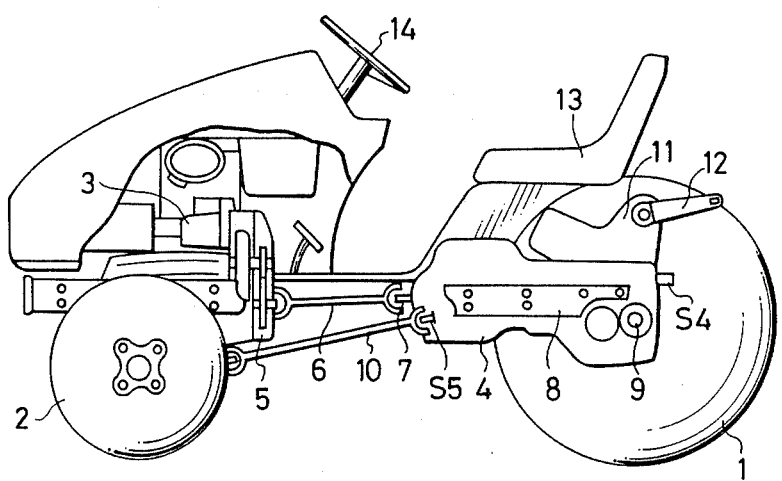
FIG. 1 is a cutaway side view of an agricultural tractor to which the present invention is applied.

FIG. 1 is a cutaway side view of an agricultural tractor to which the present invention is applied. In the FIG., 1 denotes a rear wheel and 2 denotes a front wheel. An engine 3 is mounted on the front part of the body of the tractor and a transmission case 4 is mounted on the rear part thereof. The main shaft of the engine 3 is connected to a propeller shaft 6 through a reduction gear 5. The propeller shaft 6 extends backwards along the underside of the tractor body and is connected to an input shaft 7 of the transmission case 4. The transmission case 4 is secured to a tractor body frame 8, a part of which is illustrated in the figure. The transmission case 4 contains a power transmission device which will be described hereinafter. The engine power inputted into the input shaft 7 is transmitted to a rear axle 9, a PTO shaft S4 and a front wheel drive shaft S5 via the power transmission device, which provides a suitable reduction in speed. The PTO shaft S4 transmits power to a piece of agricultural machinery such as a rotary machine which is connected to a rear part of the tractor. The front wheel drive shaft S5 transmits power to the front wheel 2 through a front wheel drive propeller shaft 10. Numeral 11 denotes a hydraulic cylinder which lifts the machinery through a lifting arm 12. Numeral 13 denotes a seat and 14 denotes a steering wheel.

(Power Transmission)

Figure 2B:
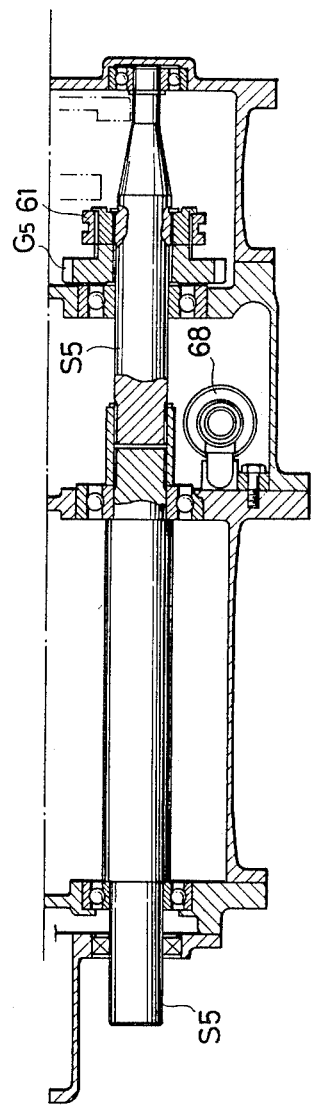
FIG. 2, which is divided in FIGS. 2A and 2B, is a sectional view of a power transmission device within a transmission case.
Figure 3:
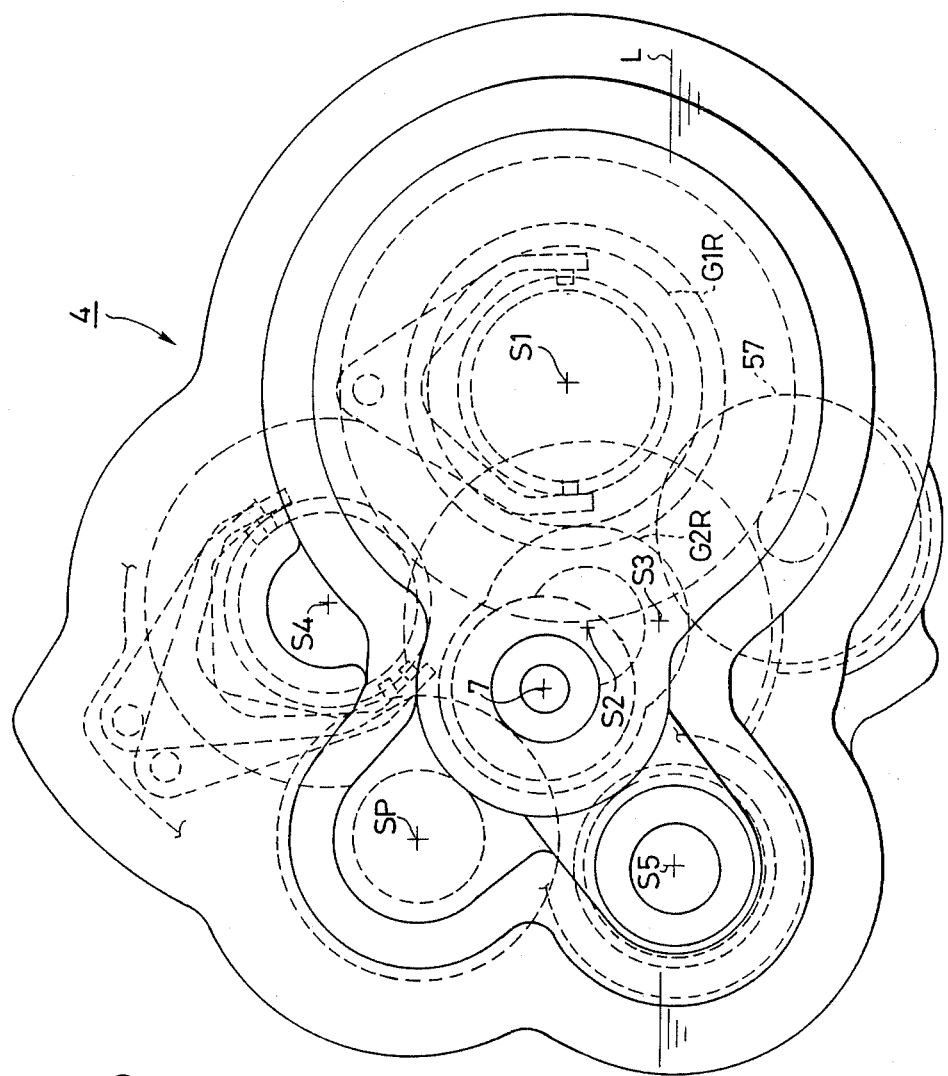
FIG. 3 is a schematic view showing the actual positional relatinship among the various shafts within the transmission case.

FIG. 2 is a sectional view of a power transmission device within the transmission case 4. As shown in the figure, the input shaft 7, the first main shifting shaft S1, the second main shifting shaft S2, the secondary shifting shaft S3, the PTO shaft S4 and the front wheel drive shaft S5 are arranged in parallel with respect to one another. It is to be noted that these shafts do not lie in a single vertical plane, as is apparent from FIG. 2. FIG. 3 illustrates an example of the positional relationship among the shafts. In this example, the first main shifting shaft S1 and second main shifting shaft S2 are horizontally arranged at approximately the same height. The secondary shifting shaft S3 and the front wheel drive shaft S5 are also horizontally arranged at almost the same height but slightly to the left of and below the first main shifting shaft S1 and second main shifting shaft S2. The PTO shaft S4 is disposed above the other shafts.

The input shaft 7, which is connected to the propeller shaft 6 as described above, is rotatably supported by bearings which are mounted on the transmission case 4 and a clutch housing 15 which is secured to the case 4. A sprocket 16 is secured to this input shaft 7. This input shaft 7 transmits the engine power to a sprocket 18 mounted on a wet multi-disc main clutch 17 through a chain.

The main clutch 17 includes a clutch shaft 20 which is pivotably supported by the transmission case 4 through a ball bearing 19. The sprocket 18 is relatively rotatably supported by the clutch shaft 20 through a needle bearing 21. A cylindrical drive member 23 with an end wall is secured to the sprocket 18 through a spring member 22 so as to absorb shocks when the clutch is engaged. A plurality of drive clutch plates 24 are supported by a spline formed on the internal periphery of the drive member 23 so as to be able to displace in the axial direction. A generally cylindrical driven member 25 with an end wall is also secured to the clutch shaft 20. A plurality of driven clutch plates 26 are supported by a spline formed on the outer periphery of the driven member 25 so as to be able to displace in the axial direction. These driven clutch plates 26 and the aforementioned drive clutch plates 24 are interposed with one another so that each driven clutch plate 26 has a drive clutch plate 24 on at least one side thereof. A disc-shaped pressure plate 27 having approximately the same diameter as a flange 25a attached to an end portion of the driven member 25 is supported in such a manner as to be able to rotate together with the driven member 25 as one unit and to displace in the axial direction with respect thereto.

The pressure plate 27 has a boss 28 which penetrates through a hole formed in the end wall of the driven member 25 and projects therefrom. The boss 28 has a lifting plate 29 secured to its end face. A coil spring 30 is disposed between the lifting plate 29 and the end wall of the driven member 25. The coil spring 30 usually biases the pressure plate 27 towards flange 25a of the driven member 25, and as a result the drive clutch plates 24 and driven clutch plates 26 are usually pressed against each other by the spring. The lifter plate 29 is supported from the back by an operating piece 32 through a ball bearing. By pushing this operating piece 32 towards the pressure plate 27 along the clutch shaft 20 using a lever 33 against the force of the coil spring 30, the pressure plate 27 is caused to move away from the flange 25a of the driven member 25. As a result, the force pressing the drive clutch plates 24 and driven clutch plates 26 against one another is removed. In other words, the main clutch 17 is disengaged.

One end portion of the clutch shaft 20, which projects into the transmission case 4, has a gear $G_{13}$ formed thereon. In this end portion, one end of the first main shifting shaft S1 is coaxially and rotatably supported by a needle bearing 34. The opposite end and the midportion of the main shifting shaft S1 are supported by ball bearings 35. The main shifting shaft S1 extends longitudinally within the transmission case 4.

Figure 4:
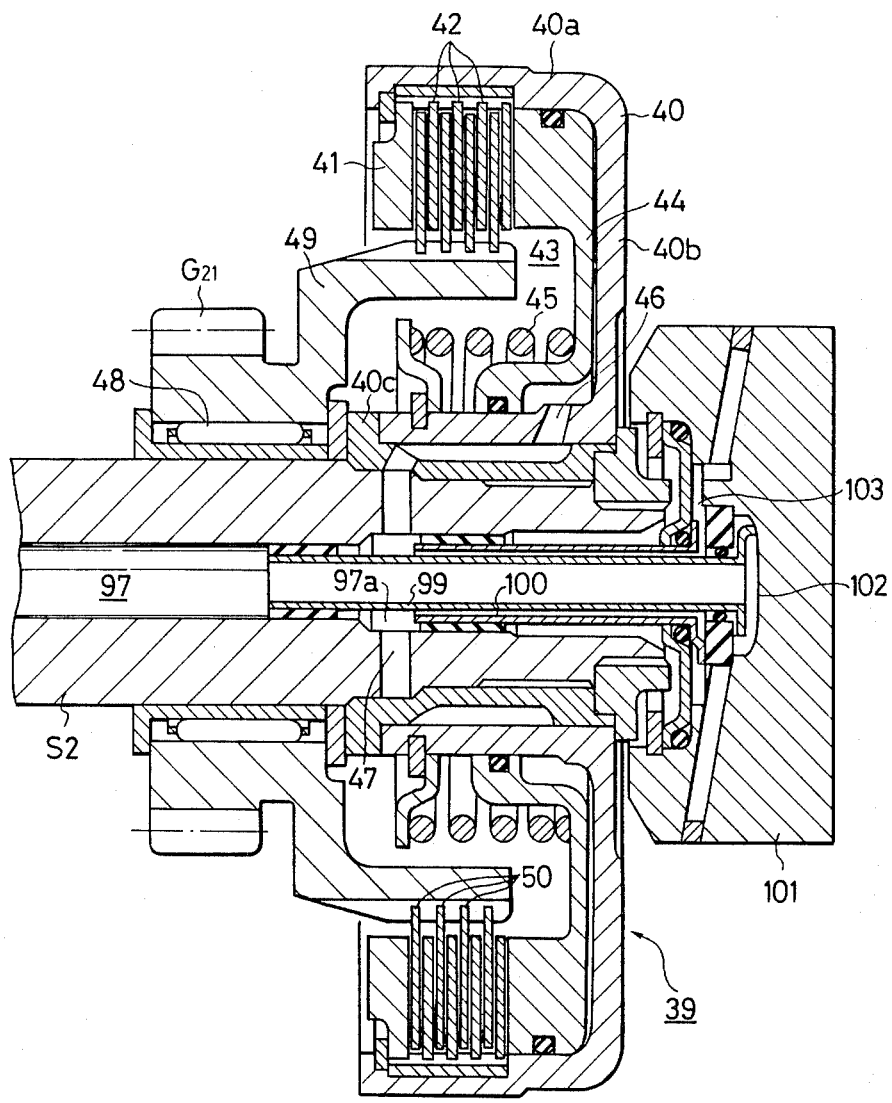
FIG. 4 is an enlarged view of a portion of FIG. 2.

The second main shifting shaft S2 is arranged adjacent to and parallel with the first main shifting shaft S1. The second main shifting shaft S2 is rotatably supported by the front wall of the transmission case 4 and a bearing wall 36 of the transmission case 4 through ball bearings 37 and 38, respectively. A gear $G_{23}$ which normally meshes with gear $G_{13}$ of the clutch shaft is secured to the front end of the second main shift shaft S2. Gears $G_{13}$ and $G_{23}$ are of the same diameter. Accordingly, the second main shifting shaft S2 is driven at the same rotational speed as the clutch shaft 20 by the clutch shaft 20 and gears $G_{13}$ and $G_{23}$ when the main clutch 17 is engaged. The other end of the second main shifting shaft S2, i.e., the end which penetrates the bearing wall 36 and projects backwards, is provided with a low-speed (first speed) hydraulic shifting clutch 39 which adjoins the bearing wall 36. The low-speed hydraulic shift clutch 39, as shown in greater detail in FIG. 4, is provided with a cylindrical drive member 40 which has an end wall and which is secured to the second main shifting shaft S2. An annular carrier plate 41 is secured to the open end of the drive member 40. A plurality of drive clutch plates 42 similar to the drive clutch plates 24 in the main clutch 17 are supported opposite the carrier plate 41 by a spline on the inner periphery of the drive member 40 so as to be able to displace in the axial direction. The peripheral wall portion 40a, the end wall portion 40b, and a boss portion 40c which is fitted on the second main shifting shaft S2 define an annular cavity 43. An operating member 44 fits into the annular cavity 43 in the same manner as a piston and is biased towards the end wall portion 40b by a spring 45. The boss portion 40c has an oil passage 46 formed therein so as to transport oil between the operating member 44 and the end wall portion 40b of the drive member 40. The oil passage 46 communicates with a clutch oil passage 47 formed in the second main shifting shaft S2 and is supplied with oil from an oil pump which will be described hereinafter through a control valve. A low-speed shifting drive gear $G_{21}$ is rotatably mounted on the second main shift shaft S2 adjacent to the drive member 40 through a needle bearing 48. Gear $G_{21}$ is formed on a driven member 49 of the low-speed hydraulic shifting clutch 39 and enters into the annular cavity 43 of the drive member 40. A plurality of driven clutch plates 50 are supported by a spline on the outer periphery of the driven member 49 so as to be able to move in the axial direction. These driven clutch plates 50 and the aforementioned drive clutch plates 42 are interposed with one another.

Since the low-speed hydraulic shifting clutch 39 is constituted as described above, when oil is supplied through the clutch oil passage 47 and oil passage 46 to the back side of the operating member 44 by shifting the gears, the operating member 44 is pushed forwards by the oil to press the drive clutch plates 42 and driven clutch plates 50 against each other. Accordingly, rotation of the second main shifting shaft S2 is transmitted to gear $G_{21}$ through drive member 40, drive clutch plates 42, driven clutch plates 50, and driven member 49 to rotate gear $G_{21}$ and second main shifting shaft S2 together as one unit. Since gear $G_{21}$ is meshed with the low-speed shifting driven gear $G_{11}$ which is secured to the first main shifting shaft S1, when the low-speed hydraulic shifting clutch 39 is engaged, it rotates the first main shifting shaft S1 and provides a reduction ratio corresponding to the ratio of the number of teeth in gears $G_{21}$ and $G_{11}$. When the low-speed hydraulic shifting clutch 39 is out of engagement, gear $G_{21}$ is driven by the first main shifting shaft S1 through gear $G_{11}$ and freely rotates about the second main shifting shaft S2.

The first main shifting shaft S1 has a second speed hydraulic shifting clutch 51 and a third speed hydraulic shifting clutch 52 at its front end. These hydraulic shifting clutches 51 and 52 are of the same constitution as the low-speed hydraulic shifting clutch 39. It is noted that the drive portions 51a and 52b of these clutches constitute a single rigid drive member which forms the end walls of the two clutches S1 and S2. The driven member 49a of the second speed hydraulic shifting clutch 51 has a gear $G_{12}$ formed thereon and is rotatably supported on the first main shifting shaft S1 by a needle bearing 53. Gear $G_{12}$ meshes with a gear $G_{22}$ which is secured to the second main shifting shaft S2. When the second speed hydraulic shifting clutch 51 is engaged in the same manner as described with respect to the low-speed hydraulic shifting clutch 39, rotation of the second main shifting shaft S2 is transmitted to the first main shifting shaft S1 through gear $G_{22}$, gear $G_{12}$, driven member 49a, and drive member 51a. As a result, a gear change ratio is provided corresponding to the number of teeth in gears $G_{22}$ and $G_{12}$. Strictly speaking, the drive members 51a and 52b act as driven members for the clutches 51 and 52. Similarly, the driven members 49a and 49b act as drive members for the clutches 51 and 52. However, the above terminology is employed in order to use the same names as for the respective parts of the afore-mentioned low-speed hydraulic shifting clutch 39.

Gear $G_{13}$ is formed on the driven member 49b of the third speed hydraulic shifting clutch 52. When the clutch 52 is engaged, rotation of the clutch shaft 20 is transmitted to the first main shifting shaft S1 through $G_{13}$, driven member 49b, and drive member 51b. As a result, the first main shifting shaft S1 is rotated at the same speed of rotation as the second main shifting shaft S2 but in the opposite direction.

The second main shifting shaft S2 is also provided at its midportion with a fourth speed and reverse hydraulic shifting clutch 54, which is of the same constitution as hydraulic shifting clutches 39, 51, and 52. Its drive member is mounted on the second main shifting shaft S2. The driven member of the clutch 54 has a gear $G_{24}$ formed thereon and is rotatably mounted on the second main shifting shaft S2 through a needle bearing 55. A reverse drive gear $G_{2R}$ is also formed on the driven member of the clutch 54. Another gear $G_{14}$, which meshes with gear $G_{24}$, is rotatably mounted on the first main shifting shaft S1 through a needle bearing 56. A reverse driven gear $G_{1R}$, which is drivingly connected with gear $G_{2R}$ through an idle gear 57 (see FIG. 3), is rotatably mounted on the first main shifting shaft S1 through a needle bearing 58. Gears $G_{14}$ and $G_{1R}$ have boss portions of the same diameter which oppose each other. An annular connecting member 59 having the same diameter is held between these boss portions. The connecting member 59 is secured to the first main shifting shaft S1 so as to rotate as one unit therewith. The outer peripheries of the boss portions of gears $G_{14}$ and $G_{1R}$ and the other periphery of the connecting members 59 have splines formed thereon. An annular selector 60 engages with the splines and slides on both the boss portions and the connecting member 59 in the longitudinal direction. When the selector 60 is astride gear $G_{14}$ and the connecting member 59, gear $G_{14}$ is connected to the first main shifting shaft S1, whereas when the selector 60 is astride gear $G_{1R}$ and the connecting member 59, gear $G_{1R}$ is connected to the first main shifting shaft S1. When the selector 60 is on the connecting member 59, both the gears $G_{14}$ and $G_{1R}$ can freely rotate with respect to the first main shifting shaft S1.

Accordingly, when the selector 60 is moved to gear $G_{14}$ to engage the clutch 54, the rotation of the second main shifting shaft S2 is transmitted at a higher rate through clutch 54, gear $G_{24}$, gear $G_{14}$, selector 60, and connecting member 59 to the first main shifting shaft S1. When the selector 60 is moved to gear $G_{1R}$ to engage the clutch 54, the rotation of the second main shifting shaft S2 is transmitted to the first main shift shaft S1 through clutch 54, gear $G_{24}$, gear $G_{2R}$, idle gear 57 (see FIG. 3), gear $G_{1R}$, selector 60, and connecting member 59. As a result, the first main shifting shaft S1 is rotated in the reverse direction.

As is apparent from the foregoing description, the engine power is transmitted to the second main shifting shaft S2 through the main clutch 17. By selectively engaging the hydraulic shifting clutches 39, 51, and 54, the engine power is transmitted using predetermined reduction ratios from the second main shifting shaft S2 to the first main shifting shaft S1. If the third speed hydraulic shifting clutch 52 is engaged, the power is transmitted from the clutch shaft 20 directly to the first main shifting shaft S1 through gear $G_{13}$, and the first main shifting shaft S1 can also be driven at a predetermined speed with respect to the second main shifting shaft S2 in the opposite direction through the fourth speed and reverse hydraulic shifting clutch 54, gear $G_{2R}$, idle gear 57, and gear $G_{1R}$. In this way, the first main shifting shaft S1 can be rotated at four speeds in forward four stages and one speed in reverse.

The rotation of the first main shifting shaft S1 is transmitted to the secondary shifting shaft S3 at three speeds. For this purpose, three gears $G_{61}$, $G_{62}$ and $G_{63}$ are secured to the first main shift shaft S1. Gear $G_{61}$ meshes with gear $G_{31}$ which is rotatably mounted on the secondary shifting shaft S3 through a needle bearing. Similarly, gear $G_{63}$ meshes with gear $G_{33}$ which is rotatably mounted on the secondary shifting shaft S3. Gear $G_{62}$ is able to mesh with gear $G_{32}$ which can slide in the longitudinal direction along the boss portion of gear $G_{31}$, the secondary shifting shaft S3, and the boss portion of gear $G_{33}$ on a spline mechanism which is similar to that of the selector 60. When gear $G_{32}$ meshes with gear $G_{62}$ as illustrated, the rotation of the first main shifting shaft S1 is transmitted to the secondary shifting shaft S3 through gears $G_{62}$ and $G_{32}$ at a reduced speed. When gear $G_{32}$ is brought out of engagement with gear $G_{62}$ and moved to position astride gear $G_{31}$ and the secondary shifting shaft S3, the rotation of the first main shifting shaft S1 is transmitted to the secondary shifting shaft S3 through the gears $G_{61}$ and $G_{31}$ at a higher speed. When gear $G_{32}$ is moved astride the secondary shifting shaft S3 and gear $G_{33}$, the rotation of the first main shifting shaft S1 transmitted to the secondary shift shaft S3 through gears $G_{63}$ and $G_{33}$ at a reduced speed. The secondary shifting shaft S3 is connected to the rear axle 9 (see FIG. 1) through a differential gear mechanism and an unillustrated final speed reduction mechanism. In this way, 12 forward speeds and three reverse speeds can be obtained.

The front whel drive shaft S5, as is apparent from FIG. 3, is adjacent to the secondary shifting shaft S3 and gear $G_{34}$, which is secured to the secondary shifting shaft S3, meshes with gear $G_5$ which is rotatably mounted on the front wheel drive shaft S5 by means of a needle bearing. Gear $G_5$ can be engaged with and disengaged from the front wheel drive shaft S5 by sliding a selector 61. The front wheel drive shaft S5 is engaged at its front end with the front wheel 2 through the front wheel drive propeller shaft 10 as described previously. By engaging and disengaging gear $G_5$ from the front wheel drive shaft S5 by operating the selector 61, the operating mode of the tractor can be shifted at suitable times to four-wheel drive by the front and rear wheels or to two-wheel drive by the rear wheels only.

The PTO shaft S4, as already described with reference to FIG. 3, it arranged above the other shafts within the transmission case 4. The rear end of the PTO shaft S4 projects outwards from the transmission case 4 so as to be able to engage with the drive system of the agricultural machinery. Three gears $G_{41}$, $G_{42}$ and $G_{43}$ are rotatably mounted on the PTO shaft S4 by means of a needle bearing in the same manner as the afore-mentioned gears. Gear $G_{41}$ normally meshes with a gear $G_{22'}$, which is integrally formed with gear $G_{22}$ which is secured to the second main shifting shaft S2. Gear $G_{22'}$ has a smaller diameter than gear $G_{22}$. Although gear $G_{41}$ is engaged with and disengaged from the PTO shaft S4 by a selector 62, since the fourth speed and reverse hydraulic shifting clutch 54 is adjacent to gears $G_{41'}$ and $G_{22'}$, in order not to interfere with the clutch 54, the boss 63 of gear $G_{41}$ extends backwards along the PTO shaft S4 and the boss 63 and PTO shaft S4 are engaged with and disengaged from each other at a position adjacent to the bearing wall 63 by the selector 62. As Gear $G_{2R}$, which has a comparatively small diameter, is mounted on the second main shifting shaft S2 at this position, there is ample room around the engaging-/disengaging mechanism comprising the selector 62. Gear $G_{42}$ normally meshes with gear $G_{22}$, while gear $G_{43}$ normally meshes gear $G_{23}$. These gears $G_{42}$ and $G_{43}$ can be selectively connected to the PTO shaft S4 by moving a selector 64 back and forth. With the foregoing constitution, the PTO shaft S4 can be driven at three speeds of rotation, i.e., low, medium, and high by the engine through the second main shifting shaft S2 by connecting gears $G_{41}$ and $G_{42}$ or gear$_{43}$ to the PTO shaft S4.

In addition to the shafts 7, 20, and S1 to S5, a pump shaft SP is arranged in parallel with the other shafts in the transmission case 4. This pump shaft SP has a gear $G_p$ secured thereto. Gear $G_p$ normally meshes with a gear $G_7$ which is secured to the input shaft 7. The front end of the pump shaft SP is connected to an oil pump 65 comprising, for example, a gear pump which is secured to the transmission case 4. The pump 65 is driven by the pump shaft SP. Oil discharged from the oil pump 65 is transferred under pressure into a lubrication passage 66 and a clutch oil passage 67 which are formed in the centers of the shafts S1 to S5, etc. in the axial direction, the oil entering these passages via a suitable passage which passes along the walls of the transmission case 4, for example. The oil passes through corresponding oil passages which branch off from passages 66 and 67 and lubricates the bearing portions of the needle bearings, etc. or the clutch plates of the hydraulic shift clutches, or actuates the operating members of the hydraulic shifting clutches. In FIG. 3, L indicates the oil level in the transmission case 4. After lubrication, the oil, which accumulates in the transmission case 4, flows back to a suction pipe 69 via an oil filter 68, is drawn in by the oil pump 65, and recirculates.

The rear end portion of the pump shaft SP penetrates through the transmission case 4 and extends backwards and is connected to a hydraulic pump for lifting the unillustrated agricultural machinery.

As described above, in this embodiment, the clutch shaft 20 of the main clutch 17 and the second main shifting shaft S2 are connected with each other by gears G13 and G23 such that the speed ratio is 1:1. Accordingly, the drive torque of the clutch shaft 20 and that of the second main shifting shaft S2 are equal and the main clutch 17 can be directly connected to the second main shifting shaft S2 without any modification. Accordingly, irrespective of the direction of rotation of the input shaft 7, the direction of rotation of the PTO shaft S4 can be clockwise as viewed from the rear, in accordance with standards, by mounting the main clutch 17 on the first main shifting shaft S1 side or by mounting it on the second shifting shaft S2 side.

Furthermore, in this embodiment, the main clutch 17 is provided between the input shaft 7 which provides power to the transmission case 4 and the main shifting shafts S1 or S2 within the transmission case 4. Accordingly, when compared with the conventional device in which a main clutch is provided between a front engine main shaft and a propeller shaft, the position of the clutch is closer to the driver and also closer to the gear change mechanisms, the gear change mechanisms being often operated together with the main clutch. Accordingly, the operation of the apparatus is easy and the operating system is simple in structure.

The oil pump for supplying oil for lubricating or operating various parts of a power transmission device generally must be connected to the engine power transmission system on the engine side of the main clutch and is driven by the engine irrespective of whether the main clutch is engaged or not. However, in this embodiment, the main clutch 17 is provided between the input shaft 7 and main shifting shafts S1 and S2 as described above. Accordingly, the input shaft 7 can be connected to the oil pump 65 and the oil pump 65 can be mounted on the transmission case 4. Therefore, the hydraulic system from the oil pump 65 to various parts within the transmission case 4 is shortened and simplified.

Furthermore, in this embodiment, a plurality of sets of hydraulic shifting clutch mechanisms (low speed hydraulic shift clutch 39, second speed hydraulic shifting clutch 51, third speed hydraulic shifting clutch 52, and fourth speed and reverse hydraulic shifting clutch 54) for transmitting power from the second main shifting shaft S2 to the first main shifting shaft S1 and a plurality of sets of gear speed shifting mechanisms ($G_{22'}$ and $G_{41}$, $G_{22}$ and $G_{42}$, and $G_{23}$ and $G_{43}$) for transmitting power from the second main shifting shaft S2 to the PTO shaft S4 are skillfully arranged among the first main shifting shaft S1, the second main shifting shaft S2, and the PTO shaft S4 which are disposed within the transmission case 4. Accordingly, a small and simple power transmission device can be obtained. Furthermore, the shifting operation can be performed smoothly. Moreover, when performing maintenance of the power transmission device, the case for the wet multi-disc main clutch does not need to be removed. It is sufficient to simply remove the transmission case from the tractor body. Thus, maintenance work becomes easy, and the assembly and disassembly of the engine for maintenance are easy, too.

Shifting into fourth speed from the second main shifting shaft S3 to the first main shifting shaft S1 and shifting into reverse are smoothly and quietly performed using only the fourth speed and reverse hydraulic shifting clutch 54. The selection of fourth speed or reverse is performed by the selector 60. Since none of gears $G_{14}$, $G_{1R}$, $G_{24}$, and $G_{2R}$ is driven by any of the shafts when the selector 60 is engaged to and disengaged from gear $G_{14}$ or $G_{1R}$, the engaging and disengaging are easy to perform. In addition, the generation of abnormal noises is reduced and the service life is prolonged. Moreover, the selector 60, which meshes with the gear $G_{14}$ for fourth speed, does not need to abruptly mesh with gear $G_{1R}$ for reverse. Instead, the reverse shifting is performed via third speed, second speed, and low speed. Accordingly, no trouble occurs even if the drive gear $G_{24}$ for fourth speed and the drive gear $G_{G2R}$ for reverse are integral with one another and connected to the second main shifting shaft S2 by the fourth speed and reverse hydraulic shifting clutch 54. As is apparent from the foregoing, gears $G_{24}$ and $G_{2R}$ do not need to be integral with one another. Instead, gear $G_{24}$ may be integral with gear $G_{21}$ for low speed. in this case, for example, gears $G_{2R}$ and $G_{1R}$ can be replaced by gears $G_{21}$ and $G_{11}$, and the low speed hydraulic shifting clutch 39 can be used as the reverse hydraulic shifting clutch.

In this embodiment, since the main shaft, i.e., clutch shaft 20, of the main clutch 17 and the main shifting shaft S2 are connected through gears $G_{13}$ and $G_{23}$ such that their speed ratio is 1:1, in the case that the third speed hydraulic shifting clutch 52 is engaged so as to directly connect the clutch shaft 20 to the first main shifting shaft S1, i.e., in third speed, the speed of rotation of the first main shifting shaft S1 and that of the second main shifting shaft S2 become equal with each other. The first main shifting shaft S1 is reduced in speed by the low speed hydraulic shifting clutch 39 and second speed hydraulic shifting clutch 51 on the basis of the rotation of the second main shifting shaft S2 or is increased in speed by the fourth speed and reverse hydraulic shifting clutch 54. Accordingly, the ranges of variation of drive torque of the first main shifting shaft S1 and second main shifting shaft S2 are almost the same. Therefore, the second speed hydraulic shifting clutch 51 and third speed hydraulic shifting clutch 52 which are mounted on the first main shifting shaft S1 and the low speed hydraulic shifting clutch 39 and the fourth speed and reverse hydraulic shifting clutch 54 which are mounted on the second main shifting shaft S2 can be of the same capacity and size. Thus, the entire device can be made compact.

(Hydraulic Circuit)

Figure 5:
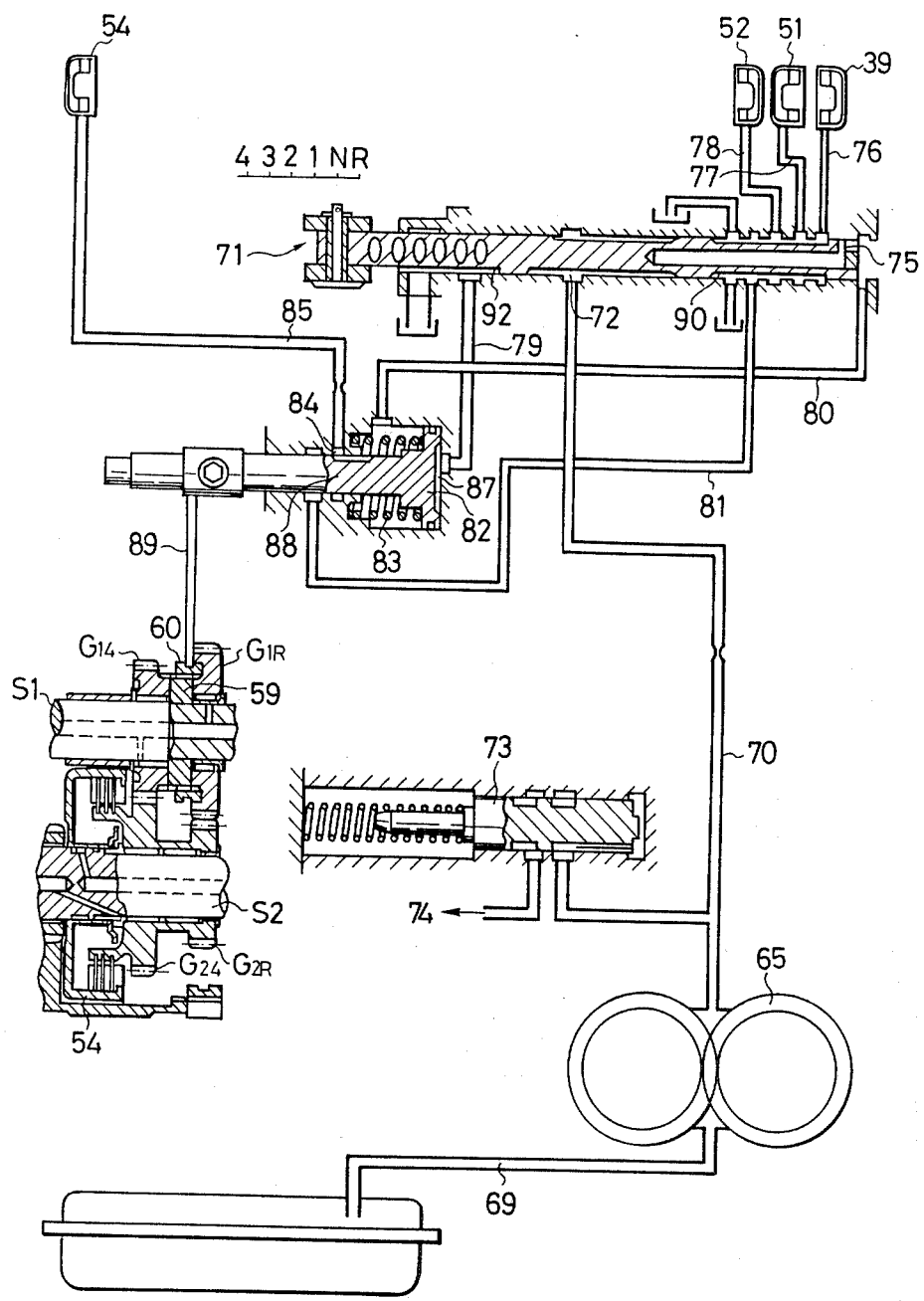
FIG. 5 is a schematic view showing a hydraulic circuit for controlling the various hydraulic shift clutches.

FIG. 5 illustrates a hydraulic circuit for controlling the hydraulic shifting clutches 39, 51, 52, and 54. A discharge port of the oil pump 65 is connected to a port 72 of a manual valve 71 through an oil passage 70. The manual valve 71 can be set at six switching positions such as neutral (N), low speed (1), second speed (2), third speed (3), fourth speed (4) and reverse (R). Oil discharged from the oil pump 65 is transferred to a lubrication passage 74 through a relief valve 73. This lubrication passage 74 communicates with the lubrication passage 66 (see FIG. 2) which is formed in the centers of shafts S1 to S5, etc in the axial direction.

When the manual valve 71 is set at its neutral position, as shown in FIG. 5, a port 75, which communicates with the port 72 of the manual valve 71, does not communicate with any one of the low speed clutch oil passage 76, second speed clutch oil passage 77, third speed clutch oil passage 78, and oil passages 79, 80, and 81. The oil discharged from the oil pump 65 is supplied only to the lubrication passage 74 through the relief valve 73.

Figure 6:
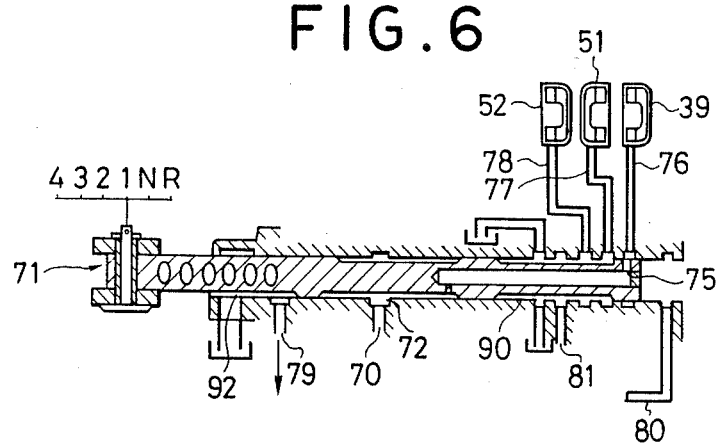
FIGS. 6 through 8 are schematic views showing the states of the hydraulic circuit when the manual valve is set to low speed, second speed, and third speed, respectively.

When the manual valve 71 is set at the low speed position as shown in FIG. 6, the port 75 is brought into communication with the low speed clutch oil passage 76, hydraulic oil is supplied to the low speed hydraulic shifting clutch 39 through oil passage 47 and oil passage 46 (see FIG. 4), the low speed hydraulic shifting clutch 39 is engaged, and the front wheel 2 and rear wheel 1 are driven in low speed.

Figure 7:
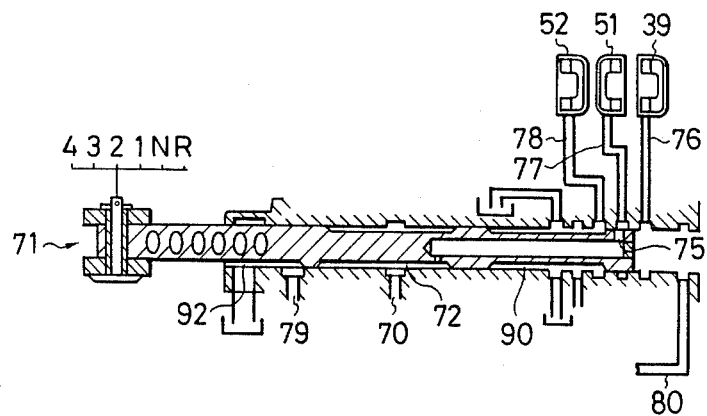

When the manual valve 71 is set at the second speed position as shown in FIG. 7, the port 75 is brought into communication with the second speed clutch oil 77, hydraulic oil is supplied to the second speed hydraulic shifting clutch 51, the second speed hydraulic shift clutch 51 is engaged, and the front wheel 2 and rear wheel 1 are driven in second speed.

Figure 8:
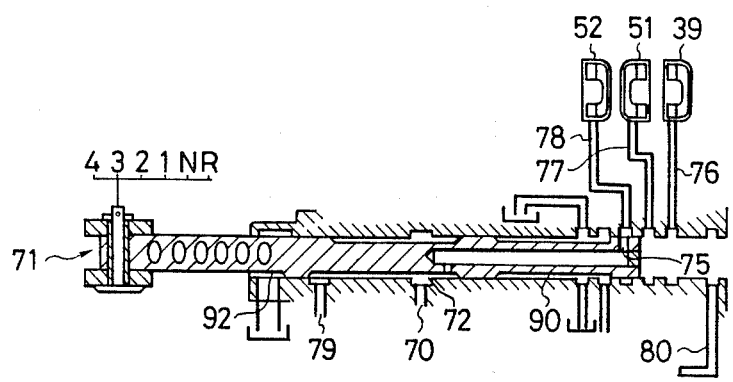

When the manual valve 71 is set at the third speed position as shown in FIG. 8, the port 75 is brought into communication with the third speed clutch oil passage 78, the third speed hydraulic shift clutch 52 is engaged in the same manner as described, and the front wheel 2 and rear wheel 1 are driven in third speed.

Figure 9:
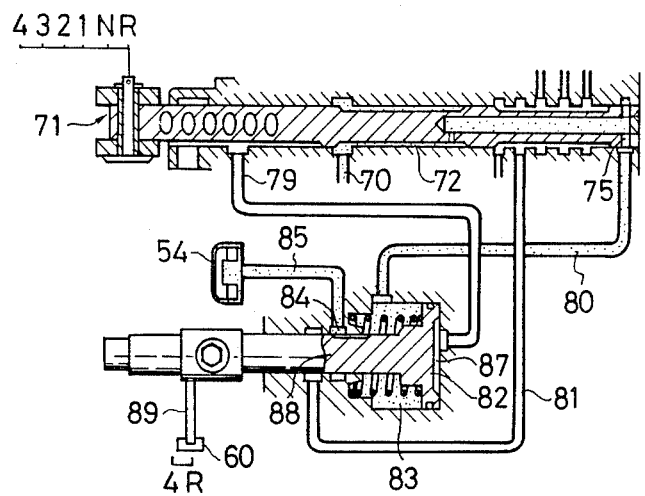
FIGS. 9 through 12 are schematic views showing the states of the hydraulic circuit when the manual valve is manipulated from reverse to fourth speed and from fourth speed to reverse, respectively.
Figure 10:
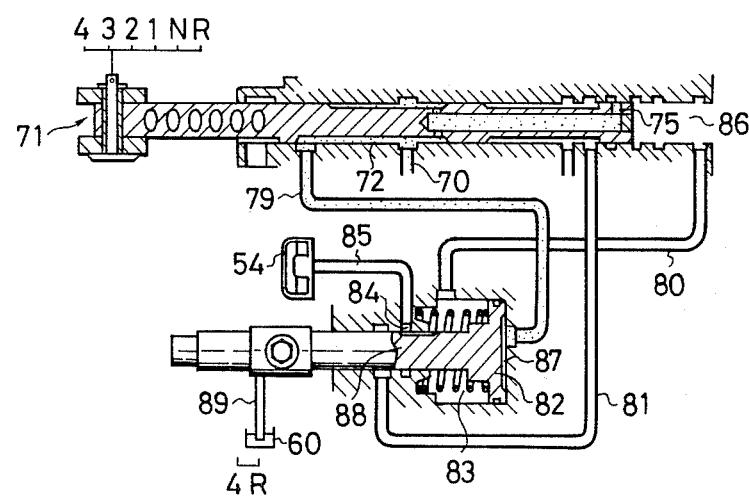

When the manual valve 71 is set in reverse as shown in FIG. 9, hydraulic oil is supplied to the fourth speed and reverse clutch 54 through oil passage 70, port 72, port 75, oil passage 80, an oil chamber 83 of an actuator 82, a port 84, and an oil passage 85, and the fourth speed and reverse clutch 54 is engaged. When the manual valve 71 is moved to the fourth speed position from this state, first, the oil passage 80 is communicated with a discharge port 86 (FIG. 10), and oil in the clutch 54 is discharged through oil port 85, port 84, oil chamber 83, oil passage 80, and a discharge port 86. Then, when the manual valve 71 is somewhere between second speed position and third speed position, as shown in FIG. 10, the oil passage 70 is brought into communication with a cylinder chamber 87 of the actuator 82, hydraulic oil is supplied into the cylinder chamber 87, and a switching valve 88 is moved leftwards.

As a result, the oil passage 85, which was in communication with the oil passage 80 through the switching valve 88, is brought into communication with the oil passage 81 through the switching valve 88. When the manual valve 71 reaches the fourth speed position as shown in FIG. 11, hydraulic oil is supplied to the clutch 54 through oil passages 81 and 85, and the clutch 54 is engaged again.

The switching valve 88 is connected with a shifting fork 89 which is coupled to the selector 60. Accordingly, due to the leftwards movement of the switching valve 88, the selector 60, which connects gear $G_{1R}$ to the first main shifting shaft S1 at the reverse driven gear $G_{1R}$ side (see FIG. 5), is moved to the fourth speed driven gear $G_{14}$ side to connect gear $G_{14}$ to the first main shifting shaft S1.

Figure 11:
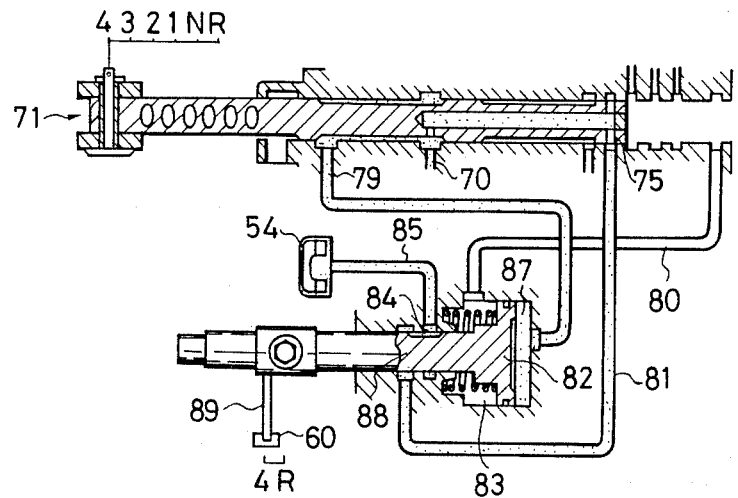
Figure 12:
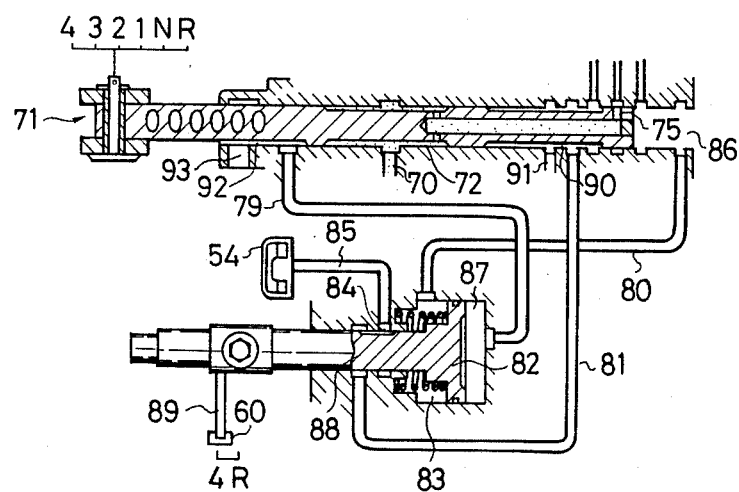

When the manual valve 71 is manipulated and once again moved to the reverse position from the fourth speed position of FIG. 11, first, as shown in FIG. 12, the oil passage 81 is brought into communication with a drain 91 through a passage 90 within the manual valve 71 and the clutch 54 is disengaged. Then, the oil passage 79 is brought into communication with the drain 93 somewhere between the third speed position and the second speed position through a passage 92. Accordingly, the switching valve 88 is moved rightwards and the selector 60, which is connected to the switching valve 88 through the shifting fork 89, is moved to the gear $G_{1R}$ side. Lastly, as shown in FIG. 9, port 70 comes into communication with oil passage 80 and the clutch 54 is again engaged.

As is apparent from the foregoing, when the manual valve 71 is in the first speed, secodn speed, or reverse position, the reverse driven gear $G_{1R}$ is connected to the first main shifting shaft S1 through the selector 60, whereas when the manual valve 71 is in a third speed or fourth speed position, the fourth speed driven gear $G_{14}$ is connected to the first main shifting shaft S1 through the selector 60.

(Oil Supply Structure)

The oil supply structure around the various shafts within the transmission case 4 will now be described.

Figure 13:
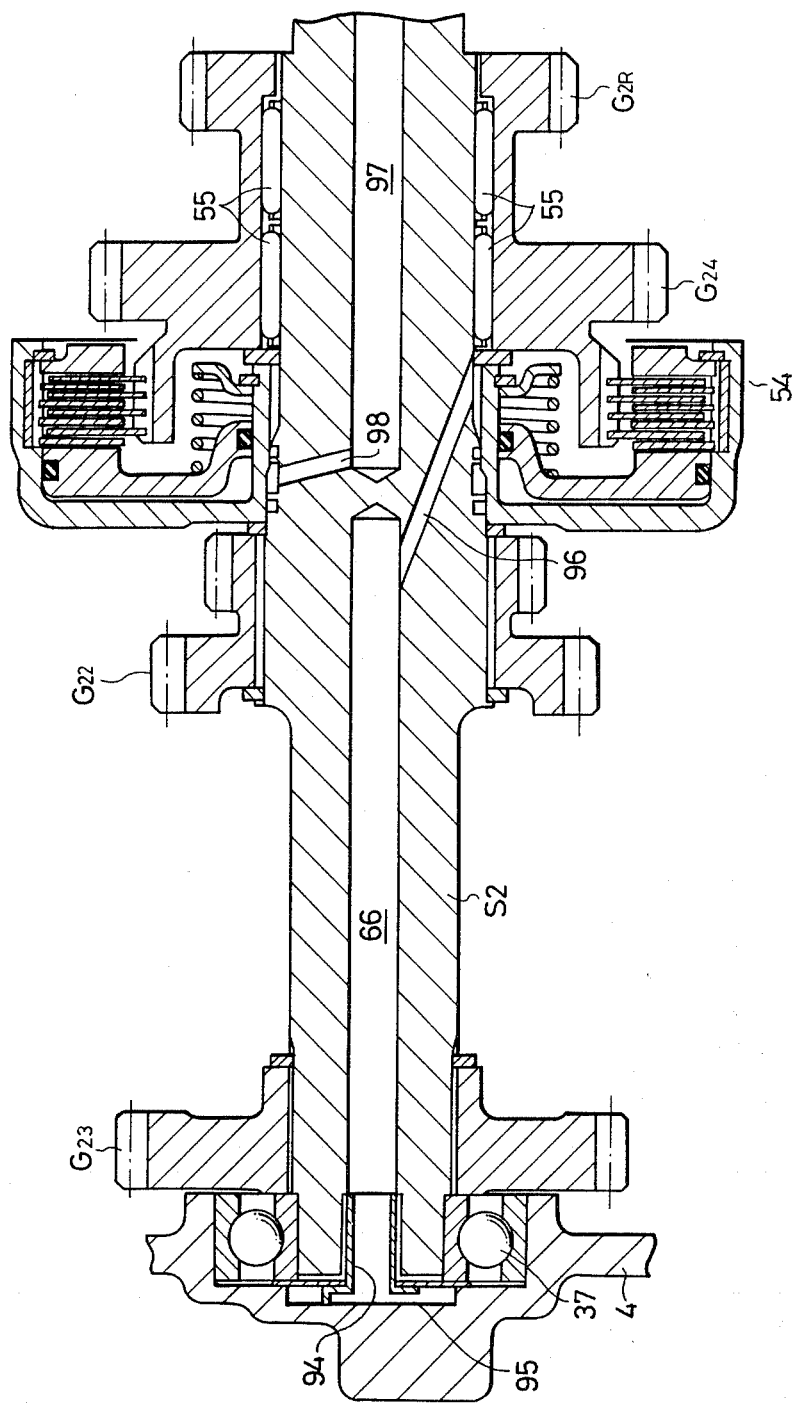
FIGS. 13 and 14 are enlarged views of portions of FIG. 2.

FIG. 13 is an enlarged sectional view of the front half of the second main shifting shaft S2. The front half of the second main shifting shaft S2, as described previously, has an axially-extending lubrication passage 66 formed along its center line. This lubrication passage 66 opens onto the front end face of the second main shifting shaft S2. A lubricating oil supply port 95 is formed by a tubular member 94 which is inserted into the opening of the lubrication passage 66. The lubricating oil supply port 95 communicates with the lubrication passage 74 (see FIG. 5) through an oil passage which is disposed along the wall of the transmission case 4. A part of the oil which is discharged from the oil pump 65 is guided to the lubrication passage 66 via the tubular member 94. An oil passage 96, which branches from the lubrication oil passage 66, is formed within the second main shifting shaft S2. The oil passage 96 communicates with the needle bearing 55 which rotatably supports gears $G_{24}$ and $G_{2R}$. Accordingly, the oil which is guided into the lubrication passage 66 reaches the needle bearing 55 and lubricates it. The oil passage 96 also communicates with the clutch plate portion of the fourth speed and reverse hydraulic shifting clutch 54 and lubricates that portion. In this way, the lubricating oil necessary for lubricating the various lubrication portions provided along the second main shifting shaft S2 can be supplied from the single one lubricating oil supply port 95 which is formed at the front end of the shaft S2.

The rear half of the second main shifting shaft S2 has a clutch oil passage 97 formed therein which extends from the rear end face of the shaft S2 in the axial direction in the same manner as the lubrication passage 66. As shown in FIG. 4, the clutch oil passage 97 has a large diameter portion 97a near the opening of the rear end thereof. The large diameter portion 97a communicates with the oil passage 46 of the low speed hydraulic shifting clutch 39 through the oil passage 47 which is formed in the radial direction in the second main shifting shaft S2. The front end portion of the clutch oil passage 97 communicates with the fourth speed and reverse hydraulic shift clutch 54 through a similar oil passage 98. The rear end portion of the clutch oil passage 97 is provided with inner and outer double tubular members 99 and 100 which are coaxially disposed and inserted into the open end of the passageway 97. The members 99 and 100 are separated from one another in the radial direction and are coaxiall relation with respect to the clutch oil passage 97. The inner tubular member 99 extends into the clutch oil passage 97 past the large diameter portion 97a. The space between the front end of member 99 and the inner wall of the clutch oil passage 97 is sealed with a sealing member. The outer tubular member 100 extends up to the midportion of the large diameter portion 54a. The space between the front end and the inner wall of the large diameter portion 97a is also sealed with a sealing member.

101 denotes a clutch oil supply port member provided on the rear end of the second main shifting shaft S2. The supply port member 101 cuts off the communication between a first clutch oil supply port 102 which communicates with the interior of the inner tubular member 99 and a second clutch oil supply port 103 which communicates with an annular clutch oil passage which is formed between the tubular members 99 and 100. These clutch oil supply ports 102 and 103 communicate with the discharge port of the oil pump 69 through the manual valve 71. When a gear change operation is performed to actuate the fourth speed and reverse hydraulic shifting clutch 54, the oil discharged from the hydraulic pump 65 is supplied to the clutch oil supply port 102 as clutch oil and is transferred to the fourth speed and reverse hydraulic shifting clutch 54 via tubular member 99, clutch oil passage 97, and oil passage 98. When a gear change operation is performed to actuate the low speed hydraulic shifting clutch 39, the oil discharged from the oil pump 65 is transferred into the clutch oil supply port 103 and then transferred to the low speed hydraulic shifting clutch 39 via the annular passage between the tubular members 99 and 100, the large diameter portion 97a of the clutch oil passage 97, and the oil passages 47 and 46. In this way, the clutch oil for actuating the hydraulic clutches 39 and 54 for changing gears which are arranged on the second main shifting shaft S2 can be supplied from a single location, i.e., from the shaft end through the clutch oil supply port member 101.

Figure 14:
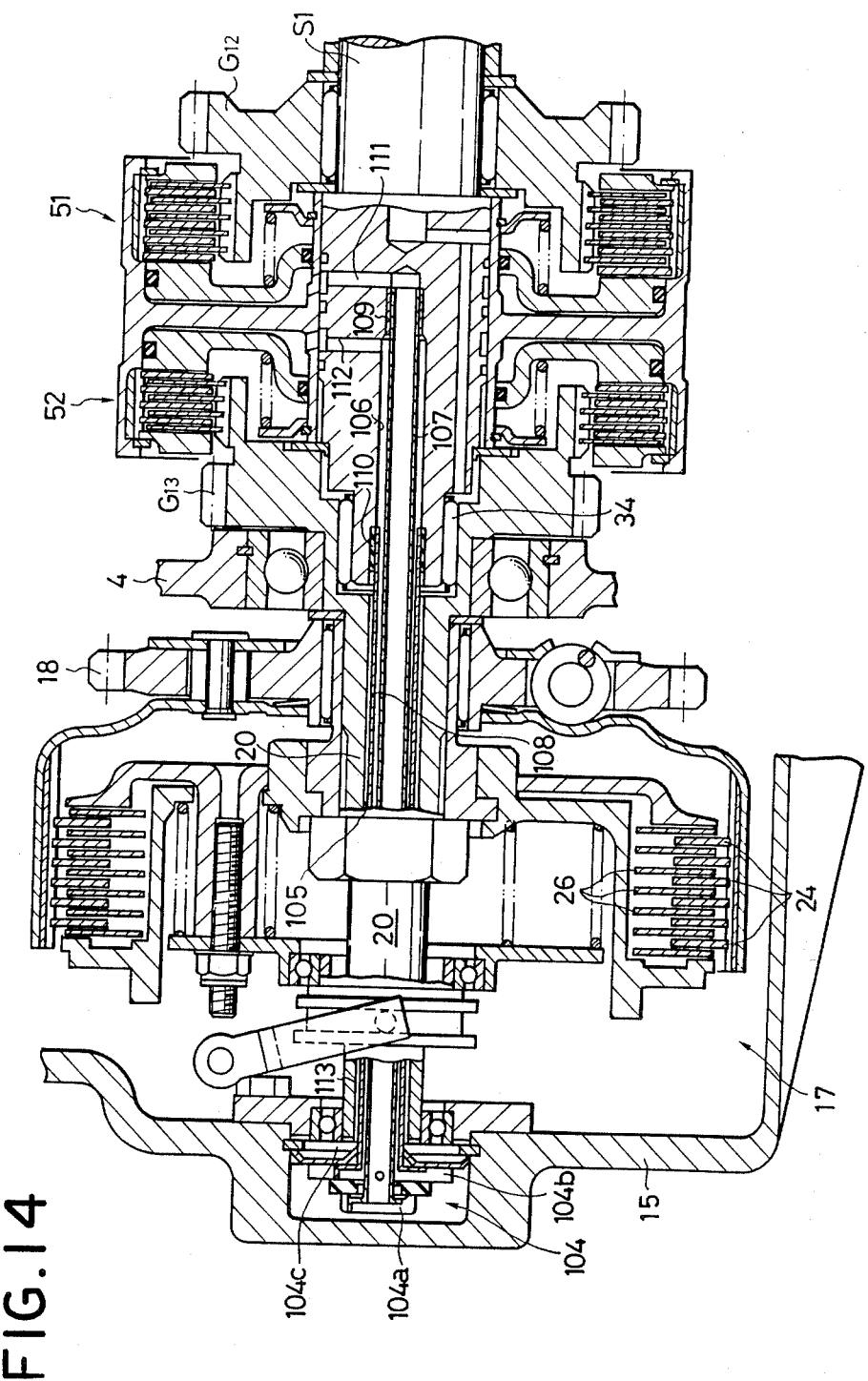

FIG. 14 is an enlarged view of the front half of the first main shifting shaft S1 and the main clutch 17.

A part of the oil discharged from the hydraulic pump 65 is transferred under pressure into an oil inlet portion 104 which is provided at the front end of the clutch shaft 20 of the main clutch 17 via an unillustrated oil passage which is disposed along the clutch housing 15. The clutch shaft 20 has an axially-extending hole 105 formed in the center which extends for the entire length of the clutch shaft 20. The first main shifting shaft S2, which is rotatably supported at its front end by the rear end of the clutch shaft 20 through the needle bearing 34, has a hole 106 which is coaxial with hole 105 formed at the center of its front end. Two oil supply tubes 107 and 108 having different diameters are concentrically inserted into the holes 105 and 106. The rear ends of the oil supply tubes 107 and 108 are rotatably supported by sealing/bearing members 109 and 110, respectively. The front ends of the oil supply tubes 107 and 108 extend up to the oil inlet portion 104. The oil inlet portion 104 is formed with oil inlet ports 104a and 104b, respectively.

The clutch oil, which is guided to the oil supply tube 107, is guided to the second speed hydraulic shifting clutch 51 through an oil passage 111 formed in the radial direction within the first main shifting shaft S1 to engage the clutch. The working oil, which is guided into the oil supply tube 62, flows backwards, passing through the annular passage formed between oil supply tube 108 and oil supply tube 107 and the annular passage formed between the hole 106 and oil supply tube 107 and is then guided to the third speed hydraulic shifting clutch 52 via an oil passage 112 to actuate the clutch.

Furthermore, a lubricating oil passage 113 is formed between the outer periphery of the oil supply tube 108 and the inner periphery of the hole 105. This lubricating oil passage 113 also has an oil inlet port 104c formed in the oil inlet port portion 104. The oil, which is discharged from the oil pump 65, is drawn in through this oil inlet port 104c as lubricating oil. The lubricating oil is guided to the rear needle bearing 34 to lubricate the bearing. Moreover, the lubricating oil may of course be guided to other parts which require lubrication such as the needle bearing 21. The clutch shaft 20 is formed with an opening in the radial direction for connecting the lubricating oil passage 113 to the interior of the main clutch 17. The space between the drive clutch plates 24 and the driven clutch plates 26 is lubricated by the oil which is supplied to the main clutch 17 through this opening.

In this way, the supply of working oil or lubricating oil to the respective clutches, bearings, etc. which are provided on the two shafts 20 and S1 which are coaxially disposed but have different rotations from each other can be performed by guiding the oil discharged from the oil pump 65 to a single oil inlet port portion 104 which is formed in the front end of the clutch shaft 20.

(Front Wheel Drive Shaft)

Figure 15:
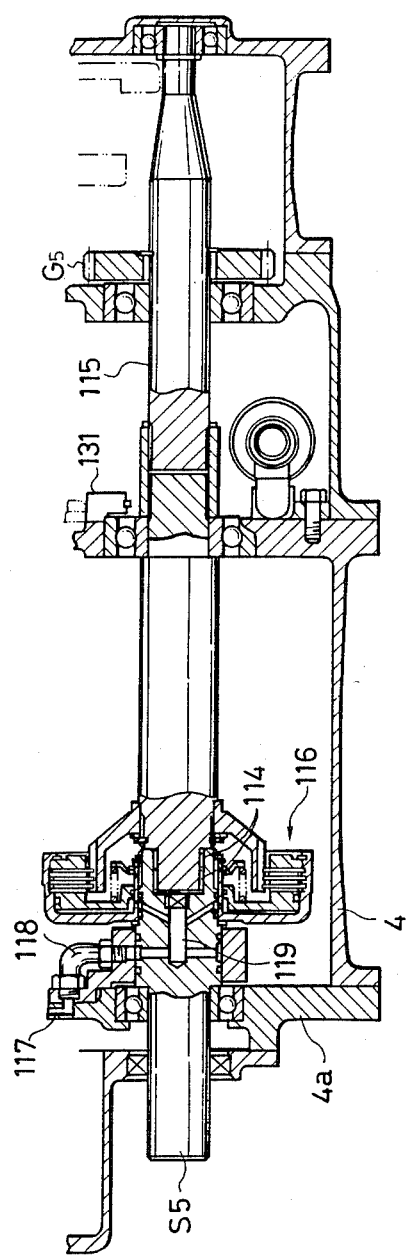
FIG. 15 is a sectional view of a portion of a modified embodiment of a front wheel drive shaft.

FIG. 15 illustrates a modified embodiment of the front-wheel drive shaft S5 of FIG. 2. With the front-wheel drive shaft S5 of FIG. 2, the engine power is transmitted to the shaft S5 by engaging gear $G_5$ with the shaft S5 through the selector 61. In FIG. 15, gear $G_5$ is secured to a front-wheel drive input shaft 115 which extends into the front-wheel drive shaft S5 and is rotatably supported by a needle bearing 114, a front-wheel drive hydraulic clutch 116 similar to the low speed hydraulic shift clutch 39 is interposed between the front-wheel drive input shaft 115 and the front-wheel drive shaft S5, and the engaging of the clutch 116 permits the engine power to be transmitted from the input shaft 115 to the front wheel drive shaft S5. The clutch oil for the front-wheel drive hydraulic clutch 116 is delivered to the clutch 116 from the oil pump 65 via an oil passage 117 which is formed in the front wall 4a for the transmission case 4, a hydraulic hose 118, and an oil passage 119 which is formed in the front drive shaft S5.

Figure 16:
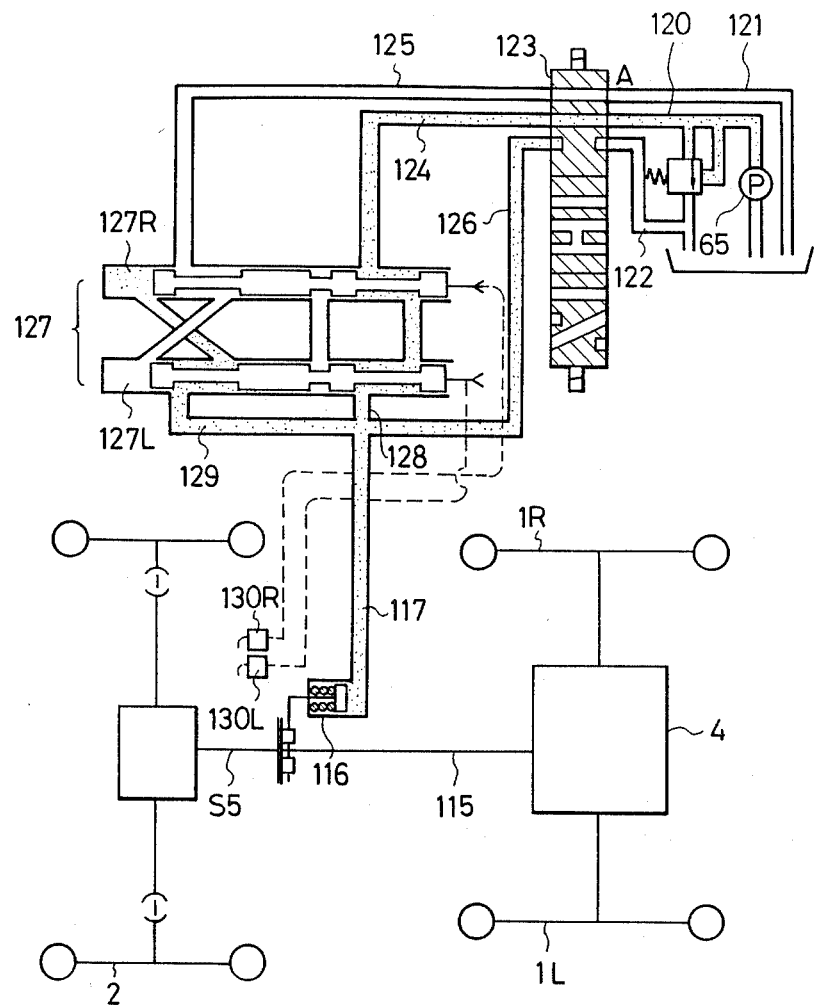
FIGS. 16 and 18 are schematic views showing various states of the circuit for controlling the front-wheel drive hyraulic clutch.
Figure 17:
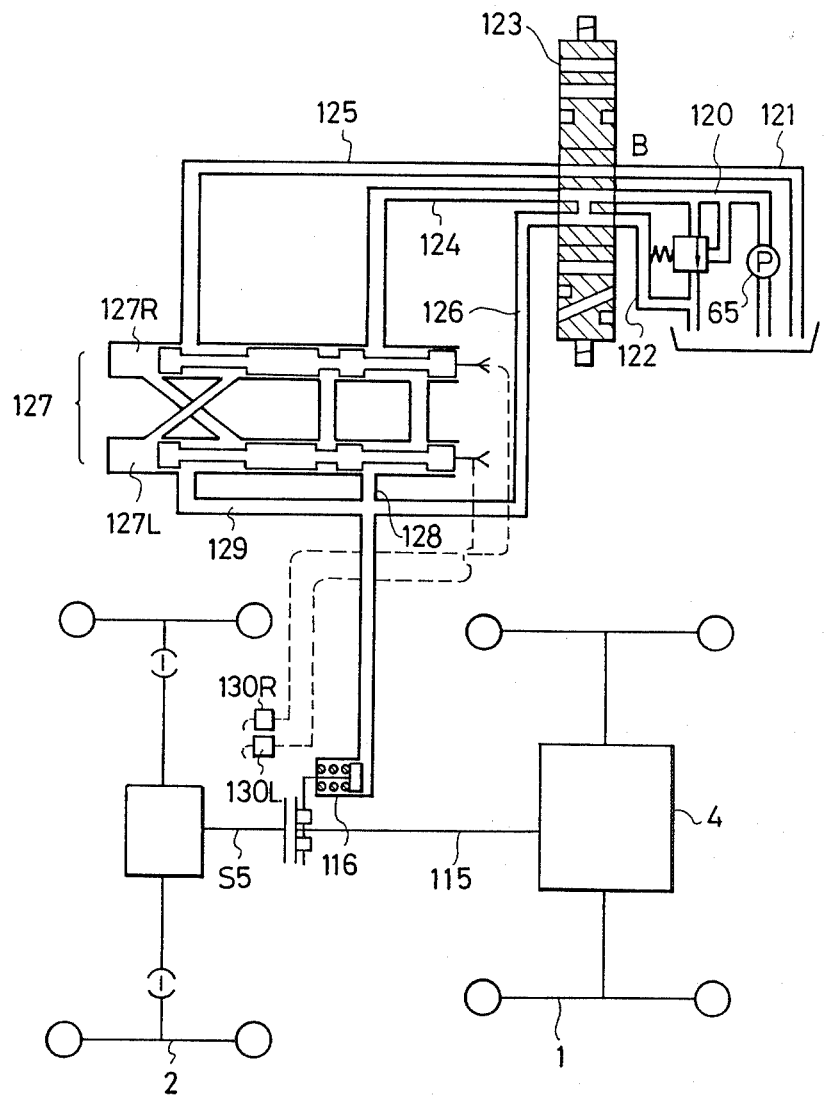
Figure 18:
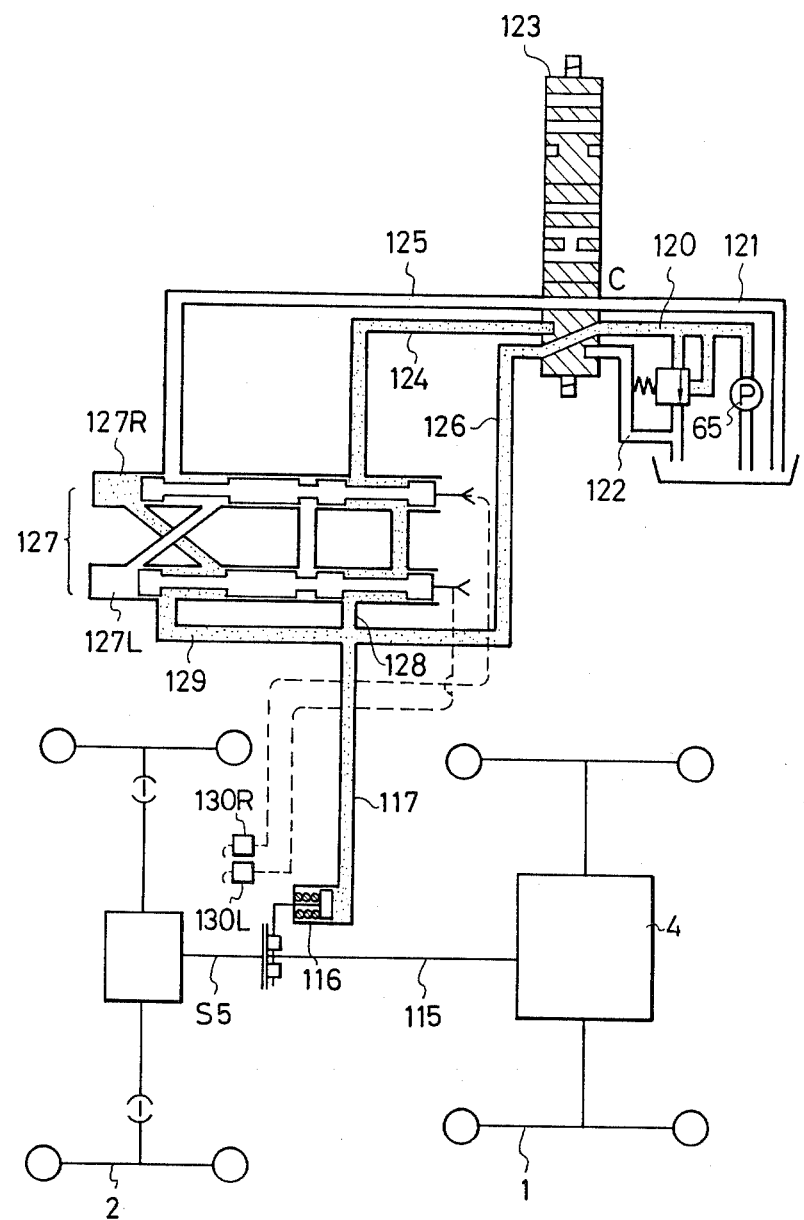

FIGS. 16 through 18 illustrate various states of operation of the hydraulic circuit for controlling the front-wheel drive hydraulic clutch 116. A discharge passage 120 of the oil pump 65 and return passages 121 and 122 are connected to a three position electromagnetic switching valve 123. The switching valve 123 is connected to oil passages 124, 125, and 126. Oil passages 124 and 125 are connected to oil passages 128 and 129, respectively, through a switching valve 127. Oil passages 126, 128, and 129 converge on oil passage 117.

The switching valve 127 comprises a right switching valve 127R and a left switching valve 127L. These change valves 127R and 127L are connected to a right brake panel 130R and a left brake pedal 130L, respectively, which are disposed on the floor in the front of the frame of the body of the tractor. The brake pedals 130R and 130L are each connected to a brake, which is mounted on the left and right rear wheels 1R and 1L of the tractor. When the brake pedals 130R and 130L are depressed, the left and right brakes are actuated.

The electromagnetic switching valve 123 can be set to three positions A, B, and C as shown in FIGS. 16, 17, and 18, respectively.

In the state that neither of the brake pedals 130R and 130L is depressed or both are simultaneously depressed when the electromagnetic valve 123 is set in position A of FIG. 16, the hydraulic oil from the oil pump 65 is supplied to the clutch 116 via discharge passage 120, switching valve 123, oil passage 124, switching valve 127, and oil passages 128 and 117, the clutch 116 is engaged and the front-wheel drive input shaft 115 is rigidly connected to the front-wheel drive shaft S5. Accordingly, both the front wheels 1 and rear wheels 2 are driven by the engine.

In FIG. 16, when one of the brake pedals 130R and 130L are depressed, the communication between oil passages 124 and 128 is cut off, and oil passage 129 communicates with oil passage 125. As a result, since the oil within the clutch 116 is discharged into the drain through the return passage 121, the clutch 116 is disengaged and the connection between the front-wheel drive input shaft 115 and front-wheel drive shaft S5 is cut off. Accordingly, the the front wheels 2 are not driven and only the rear wheels 1 are driven. In addition, since only one of the left and right rear wheels is braked, the tractor body turns to the side on which the brake is applied with a small turning radius.

When the electromagnetic valve 123 is set in position B as shown in FIG. 7, the discharge passage 120 of the oil pump 65 communicates with the return passage 122 through the switching valve 123 and no hydraulic oil is supplied to the clutch 116. Accordingly, the clutch 116 is not engaged, only the rear wheels 1 are driven, and the front wheels 2 are not driven.

When the travelling speed of the tractor exceeds a predetermined value, a speed detector 131 (see FIG. 131) is actuated, and the electromagnetic switching valve 123 is switched to position C of FIG. 18 in response to a signal from the speed detector 131. In this state, the oil discharged from the oil pump 65 is supplied to the clutch 116 through oil passage 126, bypassing the switching valve 127. Accordingly, the tractor is maintained in a state of four-wheel drive whether the brake pedals 130R and 130L are depressed or not and the engine power can be effectively used as motive power for the front and rear wheels.

What is claimed is:

1. A multistage gear shifting device for a motor vehicle in which first speed to fourth speed gear trains and reverse gear trains are arranged between two shafts in an order such that a low speed gear train comes first, one gear of each gear train being able to engage with and disengage from one of the two shafts through a hydraulic clutch, the gear shifting device including a manual valve which has operating positions correspnding to first speed to fourth speed and reverse and which is adapted to selectively operate hydraulic clutches for the respective gear trains, said one gear of the fourth speed gear train and one gear of the reverse gear train being integrally formed with each other and loosely fitting on said one of said two shafts and detachably engaged with said one of said two shafts through a common hydraulic clutch, the other gears of the fourth speed and reverse gear trains being loosely fitting on said other shaft, said multistage gear shifting device including a selector for selectively engaging said other gears of the fourth speed and reverse gear trains, an actuator for actuating said selector in response to the action of said manual valve, and a switching valve annexed to said actuator, said switching valve guiding hydraulic oil from said manual valve to said common hydraulic clutch when said manual valve is brought to an operating position corresponding to fourth speed or reverse and discharging the hydraulic oil in said common hydraulic clutch to a drain through said manual valve when said manual valve is brought to another operating position, said selector engaging said other gears of said reverse gear train to said other shaft when said manual valve is in an operating position corresponding to first speed, second speed, or reverse, and engaging said other gears of said fourth speed gear train to said other shaft when said manual valve is in an operating position corresponding to third speed or fourth speed.

2. A power transmission device for use in a motor vehicle in which an engine is mounted on the front part and a transmission case is mounted on the rear part thereof, comprising:
   an input shaft rotatably supported in a separate chamber within said transmission case and operatively connected to said engine;
   an oil pump provided on said transmission case and operatively connected to said input shaft;
   a wet multi-disk main clutch provided in said separate chamber having a drive member operatively connected to said input shaft, a driven member and a clutch shaft rotatable with said driven member;
   a first main shifting shaft disposed within said transmission case on the same axis as said clutch shaft;
   a second main shifting shaft disposed within said transmission case in parallel with said first main shifting shaft, said second main shifting shaft being operatively connected to said clutch shaft by means of gears; and
   means for mutually engaging and disengaging said first and second main shifting shafts including a first gear engageable with and disengageable from one of said main shifting shafts by a hydraulic clutch and a second gear affixed to another of said main shifting shafts and engaging with said first gear.

3. A power transmission device as claimed in claim 2 wherein said engaging and disengaging means comprises a plurality of said engaging and disengaging means selectively actuable for transmitting power from said second main shifting shaft to said first main shifting shaft at predetermined different gear ratios, and including a PTO shaft disposed within said transmission case; and a plurality of gear shifting mechanisms selectively engageable at predetermined gear ratios and adapted to transmit power from said second main shifting shaft to said PTO shaft.

4. A power transmission device as claimed in claim 3, comprising:
   a drive gear affixed to said second main shifting shaft;
   a first driven gear engageable with and disengageable from said first main shifting shaft; and
   a second driven gear engageable with and disengageable from said PTO shaft;

said first and second driven gears being continually meshed with said drive gear.

5. A power transmission device as claimed in claim 2 in which said second main shifting shaft is operatively connected to said clutch shaft such that the rotational speed ratio therebetween is 1:1 by normally meshing gears.

6. A power transmission device as claimed in claim 2, comrpising:
   a high speed drive gear and a reverse or low speed drive gear integrally formed with one another and loosely fitting on said second main shifting shaft and engageable with said second main shifting shaft by a hydraulic clutch;
   a high speed driven gear loosely fitting said first main shifting shaft and continually meshing with said high speed drive gear; and
   a reverse or low speed driven gear loosely fitting on said first main shifting shaft and continually meshing with said reverse or low speed drive gear.

7. A power transmission device as claimed in claim 2, comprising:
   a high speed driven gear and a reverse or low speed driven gear integrally formed with one another and loosely fitting on said first main shifting shaft and engageable with said first main shifting shaft by a hydraulic clutch;
   a high speed drive gear loosely fitting said second main shifting shaft and continually meshing with said high speed driven gear; and
   a reverse or low speed drive gear loosely fitting on said second main shifting shaft and continually meshing with said reverse or low speed driven gear.

8. A power transmission device as claimed in claim 2, in which said main shifting shaft having said hydraulic clutch is provided with a clutch working oil supply passage and a lubricating oil supply passage formed in the axial direction along the axis of said main shifting shaft from both ends thereof, respectively, said clutch working oil supply passages being connected to an operating portion of said hydraulic clutch and said lubricating oil supply passage being connected to a lubricating portion on said shaft.

9. A power transmission device as claimed in claim 8, in which said oil supply passages communicate with said oil pump.

10. A power transmission device for use in a motor vehicle in which an engine is mounted on the front part and a transmission case is mounted on the rear part thereof, comprising:
   an input shaft on said transmission case operatively connected to said engine;
   an oil pump provided on said transmission case and operatively connected to said input shaft;
   a wet multi-disk main clutch provided in a separate chamber within said transmission case having a drive member operatively connected to said input shaft, a driven member and a clutch shaft rotatable with said driven member;
   a main shifting shaft disposed within said transmission case in axially aligned relation to said clutch shaft and rotatable relatively thereto;
   a hydraulic clutch mounted on said main shifting shaft;
   an oil supply pipe coaxially disposed with respect to said main shifting shaft and said clutch shaft, said pipe being relatively rotatable with respect to at least one of said two shafts; and
   an oil passage within said main shifting shaft connecting said oil supply pipe with said hydraulic clutch.

* * * * *